(12) United States Patent
Shray et al.

(10) Patent No.: US 6,885,942 B2
(45) Date of Patent: Apr. 26, 2005

(54) METHOD TO DETECT AND VISUALIZE CHANGES IN FORMATION PARAMETERS AND BOREHOLE CONDITION

(75) Inventors: Frank P. Shray, Sugar Land, TX (US); John C. Rasmus, Richmond, TX (US); Simon Fleury, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 20 days.

(21) Appl. No.: 10/248,327

(22) Filed: Jan. 9, 2003

(65) Prior Publication Data

US 2004/0138818 A1 Jul. 15, 2004

(51) Int. Cl.$^7$ .............................. G01V 1/40; G01V 3/18
(52) U.S. Cl. ............................................. 702/6; 702/11
(58) Field of Search .................................. 702/6, 11, 16

(56) References Cited

U.S. PATENT DOCUMENTS

| | | | |
|---|---|---|---|
| 5,581,024 A | * 12/1996 | Meyer et al. ............ 73/152.03 |
| 5,983,164 A | * 11/1999 | Ocondi ........................ 702/12 |
| 6,152,246 A | * 11/2000 | King et al. ..................... 175/26 |
| 6,302,204 B1 | 10/2001 | Reimers et al. ......... 166/250.03 |
| 6,317,384 B1 | 11/2001 | Luo et al. ....................... 367/47 |
| 6,401,042 B1 | 6/2002 | Van Riel et al. .............. 702/17 |
| 6,405,136 B1 | * 6/2002 | Li et al. ........................ 702/10 |
| 6,408,953 B1 | 6/2002 | Goldman et al. ............. 175/39 |
| 6,543,280 B2 | * 4/2003 | Duhon ................... 73/152.01 |
| 6,571,177 B1 | * 5/2003 | Hardy .......................... 702/16 |
| 6,573,855 B1 | * 6/2003 | Hayakawa et al. ........... 342/22 |
| 2001/0032051 A1 | 10/2001 | Grismore et al. ........... 702/116 |
| 2002/0053430 A1 | 5/2002 | Curtis et al. ........... 166/250.01 |
| 2003/0074139 A1 | * 4/2003 | Poedjono ..................... 702/16 |
| 2003/0214537 A1 | * 11/2003 | Lynn ......................... 345/835 |

* cited by examiner

Primary Examiner—Marc S. Hoff
Assistant Examiner—Anthony Gutierrez
(74) Attorney, Agent, or Firm—Kevin P. McEnaney; Brigitte L. Echols

(57) ABSTRACT

A method for detecting and visualizing changes in a borehole, comprising correlating a time-depth file and a time-data file to obtain a plurality of measurements at a specific depth for a parameter, analyzing a parameter change using at least two of the plurality of the measurements to obtain an interpretation of the parameter change, and displaying the interpretation of the parameter change using a graphical representation.

23 Claims, 9 Drawing Sheets

| 400 ↘ | 402 ↙ | | 500 ↘ | 502 ↙ |
|---|---|---|---|---|
| TIME (hh:mm:ss) | BIT DEPTH (feet) | | TIME (hh:mm:ss) | RESISTIVITY MEASUREMENT (Ω-m) |
| 00:00:10 | 1000 | ⎫ | 00:00:10 | 1.0 |
| 00:00:20 | 1001 | | 00:00:20 | 1.0 |
| 00:00:30 | 1002 | | 00:00:30 | 1.0 |
| 00:00:40 | 1003 | ⎬ 404 | 00:00:40 | 1.0 |
| 00:00:50 | 1004 | | 00:00:50 | 1.0 |
| 00:01:00 | 1005 | | 00:01:00 | 1.0 |
| 00:01:10 | 1006 | | 00:01:10 | 1.0 |
| 00:01:20 | 1007 | | 00:01:20 | 1.0 |
| 00:01:30 | 1008 | ⎭ | 00:01:30 | 1.0 |
| 00:01:40 | 1009 | | 00:01:40 | 1.0 |
| 00:01:50 | 1009 | ⎫ | 00:01:50 | 1.5 |
| 00:03:00 | 1008 | ⎬ 406 | 00:03:00 | 1.5 |
| 00:03:10 | 1007 | | 00:03:10 | 1.5 |
| 00:03:20 | 1006 | | 00:03:20 | 1.5 |
| 00:03:30 | 1005 | ⎭ | 00:03:30 | 1.5 |
| 00:03:40 | 1010 | ⎫ | 00:03:40 | 1.0 |
| 00:03:50 | 1011 | | 00:03:50 | 1.0 |
| 00:04:00 | 1012 | | 00:04:00 | 1.0 |
| 00:04:10 | 1013 | ⎬ 408 | 00:04:10 | 1.0 |
| 00:04:20 | 1014 | | 00:04:20 | 1.0 |
| 00:04:30 | 1015 | | 00:04:30 | 1.0 |
| 00:04:40 | 1016 | | 00:04:40 | 1.0 |
| 00:04:50 | 1017 | | 00:04:50 | 1.0 |
| 00:05:00 | 1018 | | 00:05:00 | 1.0 |
| 00:05:10 | 1019 | ⎭ | 00:05:10 | 1.0 |
| 00:05:20 | 1020 | ⎫ 410 | 00:05:20 | 1.0 |
| 00:05:30 | 1015 | ⎬ | 00:05:30 | 1.5 |
| 00:05:40 | 1010 | ⎭ | 00:05:40 | 1.5 |
| 00:05:50 | 1011 | ⎫ | 00:05:50 | 1.5 |
| 00:06:00 | 1012 | | 00:06:00 | 1.5 |
| 00:06:10 | 1013 | ⎬ 412 | 00:06:10 | 1.5 |
| 00:06:20 | 1014 | | 00:06:20 | 1.5 |
| 00:06:30 | 1015 | | 00:06:30 | 1.5 |
| 00:06:40 | 1020 | | 00:06:40 | 1.5 |
| 00:06:50 | 1021 | | 00:06:50 | 1.0 |
| 00:07:00 | 1022 | ⎭ | 00:07:00 | 1.0 |

FIG.4        FIG.5

METHOD TO DETECT AND VISUALIZE CHANGES IN FORMATION PARAMETERS AND BOREHOLE CONDITION

BACKGROUND OF INVENTION

Well logs are measurements, typically with respect to depth, of selected physical parameters of earth formations penetrated by a wellbore. Well logs are typically recorded by inserting various types of measurement instruments into a wellbore, moving the instruments along the wellbore, and recording the measurements made by the instruments. One type of well log recording includes lowering the instruments at the end of an armored electrical cable, and recording the measurements made with respect to the length of the cable extended into the wellbore. Depth within the wellbore is inferred from the extended length of the cable. Recordings made in this way are substantially directly correlated to measurement depth within the wellbore.

Other methods for measurement include a "logging while drilling" (LWD) method, a measurement while drilling (MWD), and a memory logging method. The LWD method involves attaching the instruments to the lower portion of a drilling tool assembly used to drill the wellbore. LWD and wireline tools are typically used to measure the same sort of formation properties, such as density, resistivity, gamma ray, neutron porosity, etc. MWD tools are typically used to measure parameters closely associated with drilling, such as well deviation, well azimuth, weight-on-bit, mud flowrate, annular borehole pressure, etc.

The aforementioned well logging tools may be conveyed into and out of a well via wireline cable, drilling pipe, coiled tubing, slickline, etc. Further, LWD and MWD measurement methods allow for measurement in the drill string while the bit is cutting, or measurement while tripping down or up past a section of a borehole that had been drilled at a previous time.

Some measurement tools use a pressure modulation telemetry system, which modulates pressure of a drilling fluid (mud) flowing through the interior of the drilling tool assembly, to obtain well log data. However, a much larger quantity of well log data is stored in a recording device disposed in the log instrument, which is interrogated when the instrument is retrieved from the wellbore. This information is typically recorded with respect to time. A record of instrument position in the wellbore with respect to time made at the earth's surface is then correlated to the time/measurement record retrieved from the instrument storage device to generate a conventional "well log" of measurements with respect to wellbore depth.

Well logs are typically presented in a graphic form including a plurality of grids or "tracks" each of which is scaled from a selected lower value to a selected upper value for each measurement type presented in the particular track. A "depth track" or scale, which indicates depth in the wellbore, is typically positioned between two of the tracks. Depending on the needs of the particular user, any number of or type of measurements may be presented in one or more of the tracks. A typical well log presentation of an individual measurement is in the form of a substantially continuous curve or trace. Curves are interpolated from discrete measurement values stored with respect to time and/or depth in a computer or computer-readable storage medium. Other presentations include gray scale or color scale interpolations of selected measurement types to produce the equivalent of a visual image of the wellbore wall. Such "image" presentations have proven useful in certain types of geologic analysis.

Interpreting well log data includes correlation or other use of a very large amount of ancillary information. Such ancillary information includes the geographic location of the wellbore, geologic and well log information from adjacent wellbores, and a priori geological/petrophysical knowledge about the formations. Other information includes the types of instruments used, their mechanical configuration and records relating to their calibration and maintenance. Still other types of information include the actual trajectory of the wellbore, which may traverse a substantial geographic distance in the horizontal plane with respect to the surface location of the wellbore. Other information of use in interpreting well log data includes data about the progress of the drilling of the wellbore, the type of drilling fluid used in the wellbore, and environmental corrections applicable to the particular log instruments used.

Much of this ancillary information is applicable to any well log recorded with a particular type of well log instrument. For example, an instrument, which measures naturally occurring gamma radiation ("gamma ray"), has environmental corrections, which correspond only to the type of instrument. As one example, each wireline type gamma ray device of a selected external diameter from a particular wireline operator has the same environmental corrections for "mud weight" (drilling fluid density).

Other types of ancillary information are made available from the wellbore operator (typically an oil and gas producing entity). Examples of this type of information include the geographic location of the wellbore and any information from other wellbores in the vicinity. Still other types of ancillary information include records of initial and periodic calibration and maintenance of the particular instruments used in a particular wellbore. The foregoing is only a small subset of the types of ancillary information, which may be used in interpreting a particular well log.

FIG. 1 shows a typical manner in which well log data are acquired by "wireline," wherein an assembly or "string" of well log instruments (including sensors or "sondes" (8, 5, 6 and 3) as will be further explained) is lowered into a wellbore (32) drilled through the earth (36) at one end of an armored electrical cable (33). The cable (33) is extended into and withdrawn from the wellbore (32) by means of a winch (11) or similar conveyance known in the art. The cable (33) transmits electrical power to the instruments (8, 5, 6, 3) in the string, and communicates signals corresponding to measurements made by the instruments (8, 5, 6, 3) in the string to a recording unit (7) at the earth's surface. The recording unit (7) includes a device (not shown) to measure the extended length of the cable (33). Depth of the instruments (8, 5, 6, 3) within the wellbore (32) is inferred from the extended cable length. The recording unit (7) includes equipment (not shown separately) of types well known in the art for making a record with respect to depth of the instruments (sensors) (8, 5, 6, 3) within the wellbore (32).

The sensors (8, 5, 6, and 3) may be of any type well known in the art for purposes of the invention. These include gamma ray sensors, neutron porosity sensors, electromagnetic induction resistivity sensors, nuclear magnetic resonance sensors, and gamma-gamma (bulk) density sensors. Some sensors, such as (8, 5, and 6) are contained in a sonde "mandrel" (axially extended cylinder) which may operate effectively near the center of the wellbore (32) or displaced toward the side of the wellbore (32). Others sensors, such as a density sensor (3), include a sensor pad (17) disposed to one side of the sensor housing (13) and have one or more detecting devices (14) therein. In some cases, the sensor (3) includes a radiation source (18) to activate the formations

(36) proximate the wellbore (32). Such sensors are typically responsive to a selected zone (9) to one side of the wellbore (32). The sensor (30) may also include a caliper arm (15), which serves both to displace the sensor (30) laterally to the side of the wellbore (32) and to measure an apparent internal diameter of the wellbore (32).

The instrument configuration shown in FIG. 1 is only meant to illustrate in general terms acquiring "well log" data by "wireline" and those skilled in the art will appreciate alternatives and modifications that are equally applicable.

FIG. 2 shows a typical configuration for acquiring well log data using a logging while drilling (LWD) and measurements while drilling (MWD) system (39). The LWD/MWD system (39) may include one or more collar sections (44, 42, 40, 38) coupled to the lower end of a drill pipe (20). The LWD/MWD system (39) includes a drill bit (45) at the bottom end to drill the wellbore (32) through the earth (36). In this example, drilling is performed by rotating the drill pipe (20) by means of a rotary table (43). However, drilling may also be performed by top drives and coiled tubing drilling with downhole motors. During rotation, the pipe (20) is suspended by equipment on a drill rig (10) including a swivel (24), which enables the pipe (20) to rotate while maintaining a fluid tight seal between the interior and exterior of the pipe (20). Mud pumps (30) draw drilling fluid ("mud") (26) from a tank or pit (28) and pump the mud (26) through the interior of the pipe (20), down through the LWD/MWD system (39), as indicated by arrow (41). The mud (26) passes through orifices (not shown) in the bit (45) to lubricate and cool the bit (45), and to lift drill cuttings in through an annulus (34) between the pipe (20), LWD/MWD system (39), and the wellbore (32).

The collar sections (44, 42, 40, 38) include sensors (not shown) therein which make measurements of various properties of the earth formations (36) through which the wellbore (32) is drilled. These measurements are typically recorded in a recording device (not shown) disposed in one or more of the collar sections (44, 42, 40, 38). LWD systems known in the art typically include one or more sensors (not show), which measure formation properties such as density, resistivity, gamma ray, neutron porosity, etc. as described above. MWD systems known in the art typically include one or more sensors (not show) which measure selected drilling parameters, such as inclination and azimuthal trajectory of the wellbore (32). MWD systems also provide the telemetry (communication system) for any MWD/LWD tool sensors in the drill string. Other drilling sensors known in the art may include axial force (weight) applied to the LWD/MWD system (39), and shock and vibration sensors.

The LWD/MWD system (39) typically includes a mud pressure modulator (not shown separately) in one of the collar sections (44). The modulator (not shown) applies a telemetry signal to the flow of mud (26) inside the system (39) and pipe (20) where the telemetry signal is detected by a pressure sensor (31) disposed in the mud flow system. The pressure sensor (31) is coupled to detection equipment (not shown) in the surface recording system (7A), which enables recovery and recording of information transmitted in the telemetry scheme sent by the MWD portion of the LWD/MWD system (39). As explained, the telemetry scheme includes a subset of measurements made by the various sensors (not shown separately) in the LWD/MWD system (39). The telemetry of the logging tools may also be determined using wireline cable (not shown), electrical MWD telemetry (i.e., using electrical signals transmitted through the formation), or wired drill pipe. The remainder of the measurements made by the sensors (not shown) in the LWD/MWD system (39) may be transferred to the surface recording system (7A) when the LWD/MWD system (39) is withdrawn from the wellbore.

In a similar manner to the wireline acquisition method and system shown in FIG. 1, the LWD/MWD acquisition system and method shown in FIG. 2 is only meant to serve as an example of how data are acquired using MWD/LWD systems, and those skilled in the art will appreciate alternatives and modifications that are equally applicable.

Well log formats have been the traditional method for displaying multiple passes of formation and borehole measurements. A typical well log data presentation is shown in FIG. 3. The data presentation shown in FIG. 3 is typically made substantially entirely from data recorded by the well log instrument and entered in the recording system by an operator at the wellsite. As described above, the well log data are typically presented on a grid-type scale including a plurality of data tracks (50, 54, 56). The presentation shown in FIG. 3 is a standard format prescribed in, *Standard Practice* 31A, published by the American Petroleum Institute, Washington, D.C. which includes 3 such tracks. The tracks (50, 54, 56) include a header (57) which indicates the data type(s) for which a curve or curves, (51, 53, 55, 59) are presented in each track. A depth track (52), which shows the measured depth (or alternative depth measure such as true vertical depth) of the data is disposed laterally between the first (50) and second (54) data tracks. The depth tracks (52) may alternatively use a time-based scale. Data curves (51, 52, 53, 54) are presented in each of the tracks (50, 54, 56) corresponding to the information shown in the header (57). The example data presentation of FIG. 3 is only one example of data presentations that may be used with embodiments of the invention and those skilled in the art will appreciate alternatives and modifications that are equally applicable.

A presentation such as shown in FIG. 3 may include in the various curves (51, 53, 55, 59) "raw" data, such as values of voltages, detector counts, etc. actually recorded by the various sensors in the well log instrument (not shown in FIG. 3), or more commonly, shows values recorded by the sensors converted to values of a parameter of interest, such as natural gamma radiation level, resistivity, acoustic travel time, etc. These presentations may generally be made only from the raw data themselves and universally applied scaling and correction factors. Still other presentations of the various curves may include data to which environmental corrections have been applied. Typically, raw data and such minimally corrected data may be recorded at the wellsite without the need to enter significant amounts of data other than the data recordings from the instruments themselves.

Two files are used to routinely process and present LWD data, as shown in FIG. 3, a time-depth file and a time-data file. The time-depth file contains a column of clock time and a column of bit depth (i.e., the depth of the bit at the corresponding clock time). The time-data file contains a column of clock time (synchronized with the time-depth file) and a corresponding sensor measurement ( e.g., a resistivity measurement) made at that clock time. With a known depth offset between the bit and the measurement sensor, the measurement value can be displayed at the corresponding formation depth. Typically, only the first measurement at a specific depth is displayed. All subsequent sensor measurements at a specific depth are disregarded in standard LWD log processing, regardless of how many more times the sensor passes by that depth. An abundance of potentially valuable data subsequently goes unused and unseen.

FIG. 4 shows a textual representation of a typical time-depth file. The time is displayed in first column (400) in an hh:mm:ss format. The bit depth corresponding to the time is displayed in a second column (402). The bit depth is recorded at 10-second intervals. In section (404) the bit depth is increasing, in section (406) the bit depth is decreasing (i.e., certain portions of the wellbore are passed by a second time), in section (408) the bit depth continues to increase, in section (410) the bit depth decreases, and in section (412) the bit depth subsequently increases.

As shown in FIG. 4, the bit depth does not always get deeper; sometimes in the process of drilling a well, the bit (and hence everything in the drillstring) is raised "off bottom" of the wellbore. As the drill string is raised and subsequently lowered back to "bottom," the bit and measurement sensors in the drillstring, pass by the same depth interval of the formation. These subsequent trips past the same depth interval can be seconds, minutes, hours, days, and/or weeks apart.

FIG. 5 shows a textual representation of a time-data file corresponding to the time interval shown in FIG. 4. The time is displayed in first column (500) using an hh:mm:ss format. The sensor measurement, in this example resistivity corresponding to the time, is displayed in a second column (502). The sensor measurement is recorded at 10-second intervals. Traditional processing of the time-depth file (FIG. 4) and the time-data file (FIG. 5) typically presents sensor measurements whenever the bit depth increases. Upon close inspection, the traditional resistivity log, using the time-depth file shown in FIG. 4 and the time-data file shown in FIG. 5, indicates that the formation resistivity is 1.0 Ω-m from 1000 ft to 1022 ft. However, every time the sensor made another pass over the same depth interval, the sensor recorded a value of 1.5 Ω-m. For example, at a depth of 1009 ft, the first pass of the sensor recorded a resistivity of 1.0 Ω-m, and a second pass of the sensor at 1009 ft recorded a resistivity of 1.5 Ω-m. The overlapping data (i.e., sensor measurements of the same depth at different times) is traditionally unseen and unused. Yet, a change in a sensor measurement, between the two passes, may indicate a change in downhole conditions, such as formation and borehole conditions, that may be useful in determining how an operator should proceed in drilling, completing, or producing a well. In the example shown in FIGS. 4 and 5, a change in the resistivity value may provide an early indication that the formation is fracturing, or it may help determine the type of fluid within the pore space.

SUMMARY OF INVENTION

In general, in one aspect, the invention relates to a method for detecting and visualizing changes in a borehole, comprising correlating a time-depth file and a time-data file to obtain a plurality of measurements at a specific depth for a parameter, analyzing a parameter change using at least two of the plurality of the measurements to obtain an interpretation of the parameter change, and displaying the interpretation of the parameter change using a graphical representation.

In general, in one aspect, the invention relates to a computer system for detecting and visualizing changes in a borehole, comprising a processor, a memory, a storage device, a computer display, and software instructions stored in the memory for enabling the computer system under control of the processor, to perform correlating a time-depth file and a time-data file to obtain a plurality of measurements at a specific depth for a parameter, analyzing a parameter change using at least two of the plurality of the measurements to obtain an interpretation of the parameter change, and displaying the interpretation of the parameter change using a graphical representation.

In general, in one aspect, the invention relates to an apparatus for detecting and visualizing changes in a borehole, comprising means for correlating a time-depth file and a time-data file to obtain a plurality of measurements at a specific depth for a particular parameter, means for analyzing a parameter change using at least two of the plurality of the measurements to obtain an interpretation of the parameter change, and means for displaying the interpretation of the parameter change using a three-dimensional representation.

Other aspects and advantages of the invention will be apparent from the following description and the appended claims.

BRIEF DESCRIPTION OF DRAWINGS

FIG. 4 shows a textual representation of a typical time-depth file.

FIG. 5 shows a textual representation of a time-data file corresponding to the time interval shown in FIG. 4.

DETAILED DESCRIPTION

Figures 1, 7:
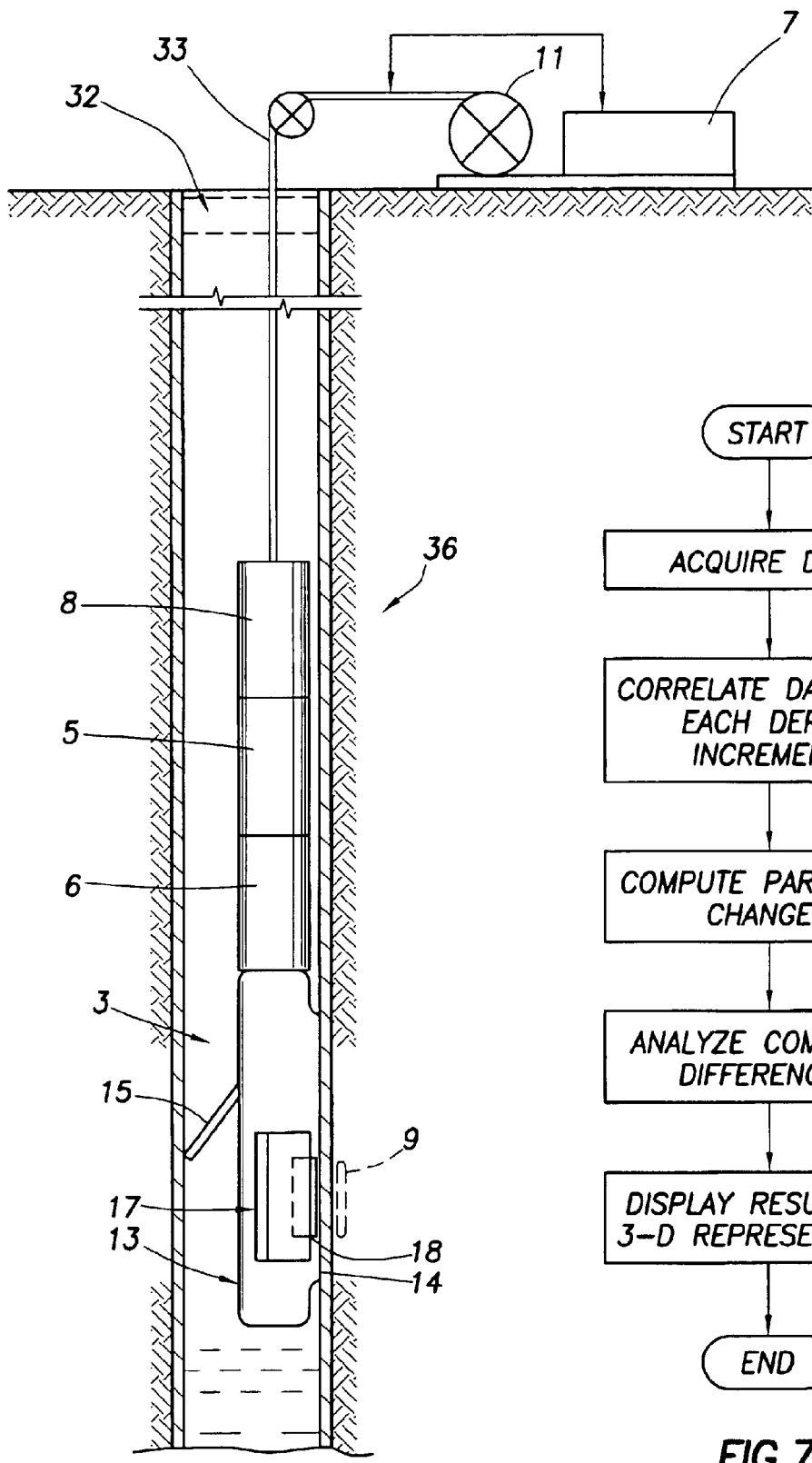
FIG. 1 shows typical well log data acquisition using a wireline conveyed instrument.
FIG. 7 shows a flow chart in accordance with one embodiment of the invention.
Figure 2:
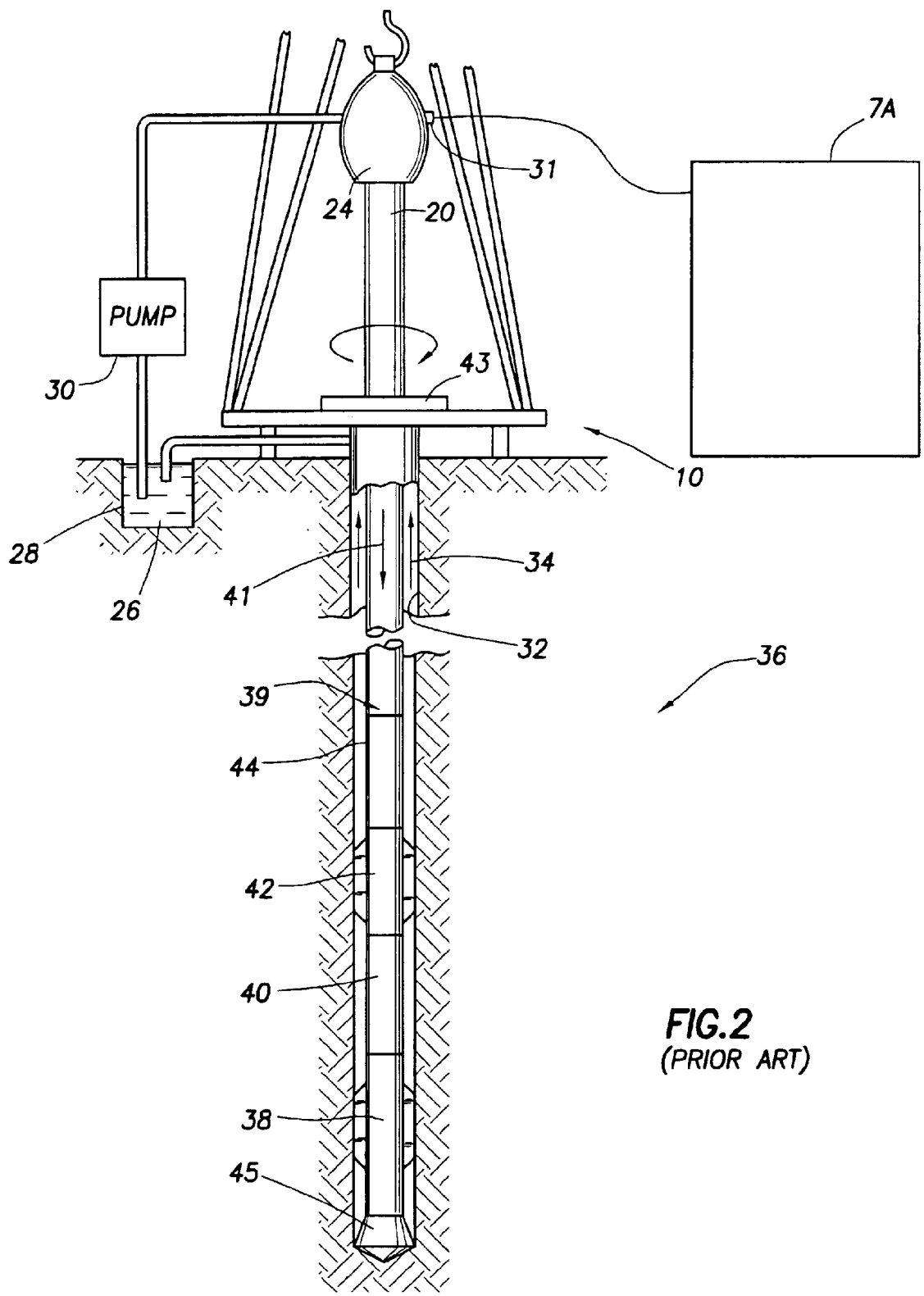
FIG. 2 shows a typical well log data acquisition system using a LWD/MWD method.
Figure 3:
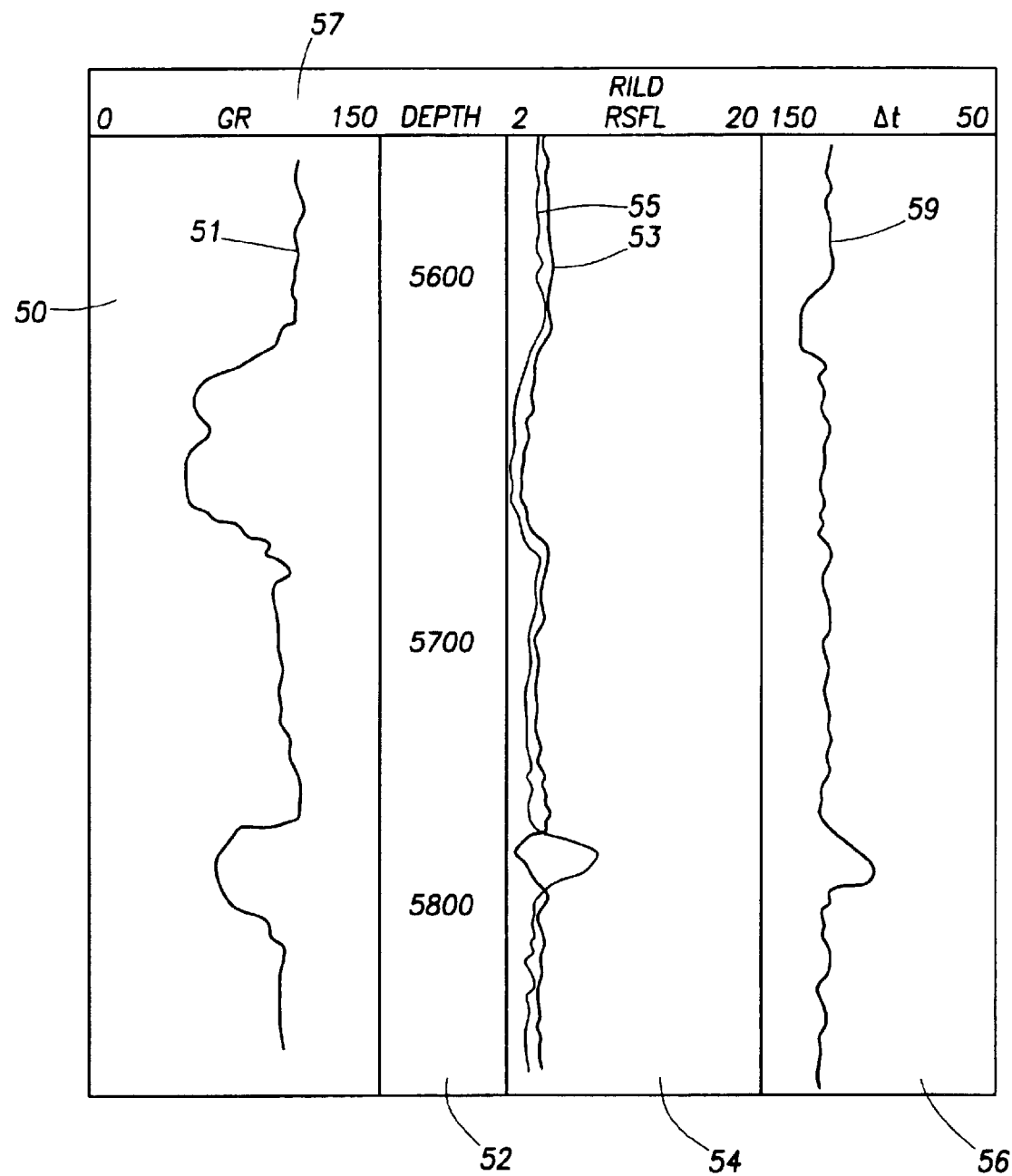
FIG. 3 shows a graphical representation of a well log data presentation.

Exemplary embodiments of the invention will be described with reference to the accompanying drawings. Like items in the drawings are shown with the same reference numbers.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

The invention relates to a method for detecting and visualizing changes in a borehole. One or more embodiments of the invention may involve correlating a time-depth file and a time-data file to obtain all measurements recorded at a specific depth. One or more embodiments may involve analyzing the change in the recorded measurements at a given depth. Further, one or more embodiments may involve displaying the results of the analysis.

Figure 6:
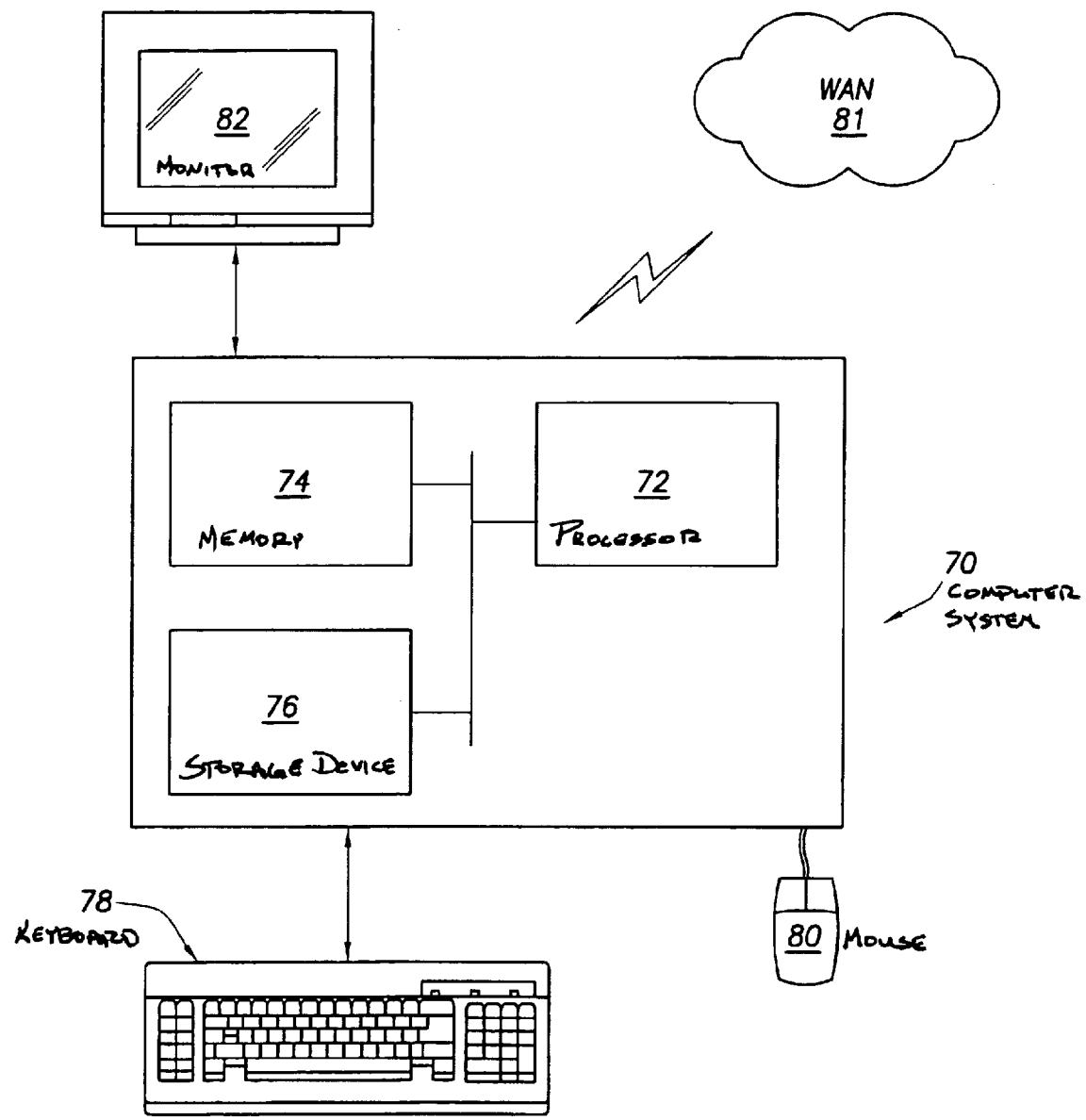
FIG. 6 shows a typical networked computer system.

The invention may be implemented on virtually any type computer regardless of the platform being used. For example, as shown in FIG. 6, a typical networked computer system (70) includes a processor (72), associated memory (74), a storage device (76), and numerous other elements and functionalities typical of today's computers (not shown). The computer (70) may also include input means, such as a keyboard (78) and a mouse (80), and output means, such as a monitor (82). The networked computer system (70) is connected to a wide area network (81) (e.g., the Internet) via network interface connection (not shown). Those skilled in the art will appreciate that these input and output means may take other forms.

FIG. 7 shows a flow chart in accordance with one embodiment of the invention. Initially data is acquired from one or more well log sensors (Step 700). The data may be acquired using any single or combination of the following measurement sensors in open hole and/or cased hole: downhole LWD sensors, measurement-while-drilling (MWD) sensors, wireline and drillpipe-conveyed wireline tools, drillpipe-conveyed sensors, coiled-tubing conveyed sensors, casing-conveyed sensors, tractor-conveyed sensors, permanent downhole sensors, oilfield production data sensors, etc.

The data that is acquired corresponds to well known logging parameters. The well logging parameters may include, but are not limited to, weight-on-bit, torque, flowrate-in, flowrate-out, standpipe pressure, temperature, relative to bit depth, gamma ray, resistivity, density, porosity, velocity, caliper for hole size and shape, borehole annular pressure, downhole weight-on-bit and torque, inclination, azimuth, formation pressure, borehole sigma, formation sigma, thermal neutron porosity, epithermal neutron porosity, and magnetic resonance bound fluid volume, free fluid volume, porosity, and the complete T2 spectrum (or components of the T2 distribution).

Returning to FIG. 7, once the data is acquired, the data is correlated for each depth increment (Step 702). In one embodiment of the invention, the time-depth files and the time-data files are correlated to collect and compute, (if necessary) from a combination of sensors, all measurements made at a specific depth. This information may be displayed to a user via graphical user interface.

Figure 8:
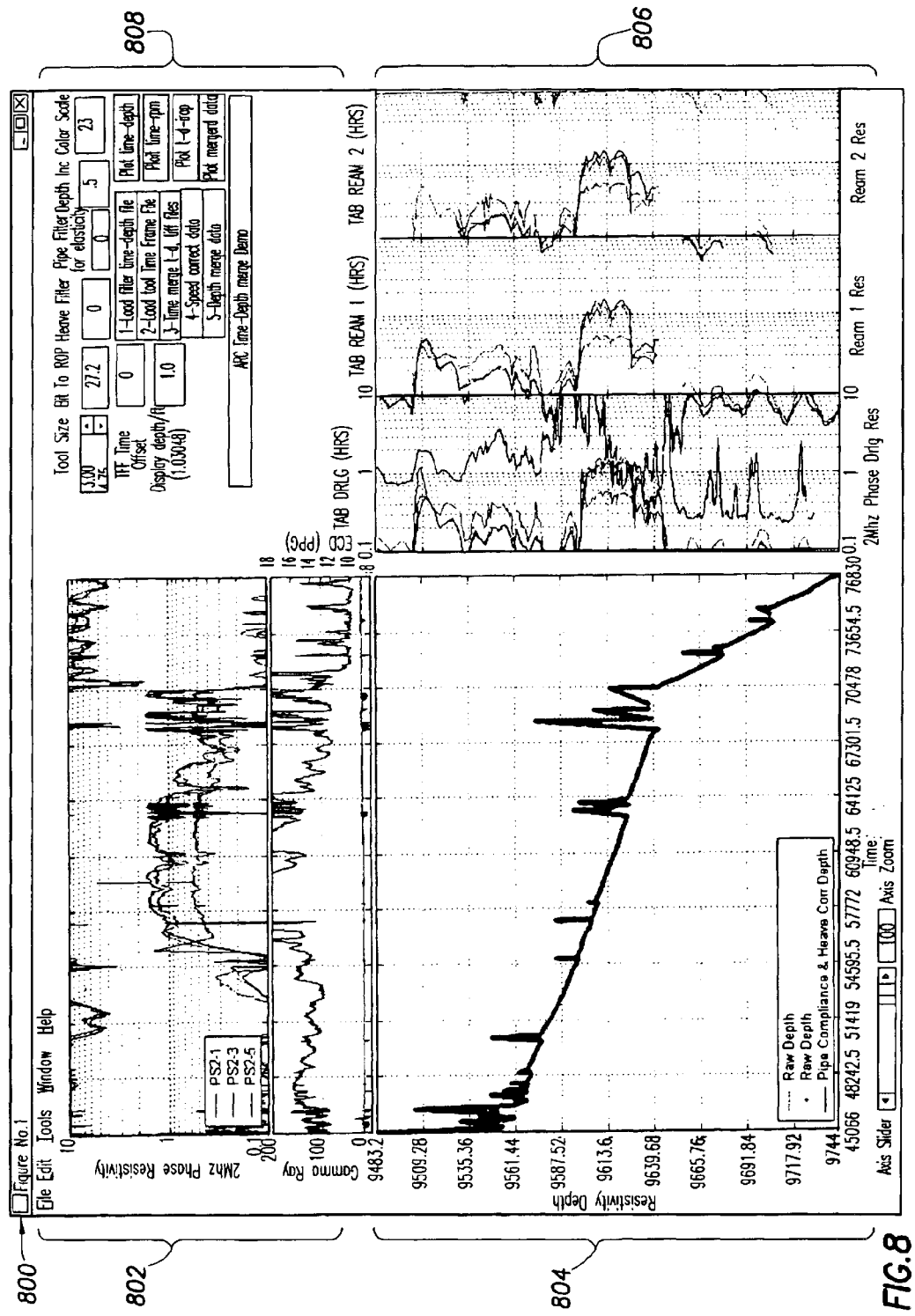
FIG. 8 shows a graphical user interface in accordance with one embodiment of the invention.

FIG. 8 shows a graphical user interface in accordance with one embodiment of the invention. The graphical user interface (800) includes four separate panels. The first panel (802) displays sensor data versus time. The second panel (804) shows a plot of the time-depth file, with depth (bit depth or sensor depth) in the y-axis and time in the x-axis. The third panel (806) shows sensor data at three different times over the same depth interval. The fourth panel (808) shows various adjustable parameters for the graphical user interface (800) such as tool size, depth increment, etc.

Returning to FIG. 7, once the data has been correlated for each depth increment, the parameter changes, if any, are computed (Step 704). The computed parameter changes may be the difference and/or alternatively the rate of change between a base parameter value and a subsequent parameter value(s) at a specific depth. The difference may be calculated in any number of ways. For example, consider a parameter value that is measured at the same depth at an initial time ($p_1$), a second time ($p_2$), and a third sample time ($p_n$). The displayed value ($p_D$) may be computed as: $p_D=(p_1-p_n)$, or alternatively as $p_D=(p_1-p_2)+(p_2-p_3)+ \ldots +(p_{n-1}-p_n)$. Further, if $p_D$ represents a time rate of change, then $p_D$ may be determined using the following formula: $p_D=(p_1-p_n)/(T_n T_1)$, where $T_1$ and $T_n$ represent the time when the $p_1$ and $p_n$ are measured, respectively.

Figure 9:
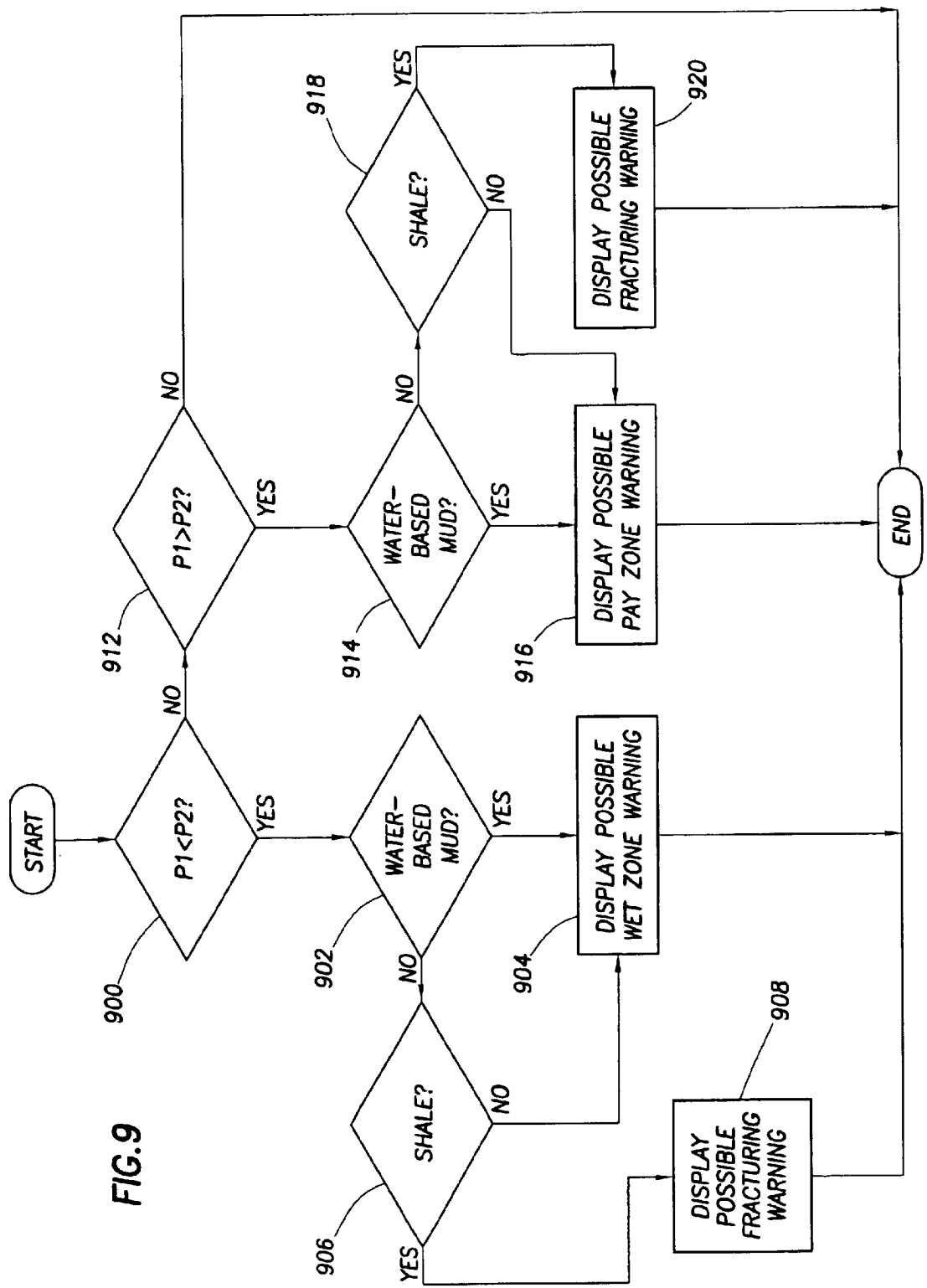
FIG. 9 shows process logic for a phase shift resistivity measurement in accordance with one embodiment of the invention.

Once the parameter changes have been computed, the differences are analyzed to determine their significance (Step 706). In one embodiment of the invention, process logic is used to determine the significance of a change in the parameter. FIG. 9 shows process logic for a phase shift resistivity measurement in accordance with one embodiment of the invention. If P1 (i.e., first measurement with respect to time) is less than P2 ( i.e., a second measurement with respect to time) (Step 900) then a determination is made whether the mud being used is water-based mud (Step 902). If the mud is water-based mud, a Possible Wet Zone Warning may be displayed to the user (Step 904). Alternatively, if the mud is not a water-based mud, then a determination is made whether the formation being drilled is a shale (Step 906). If the formation is a shale, then a Possible Fracturing Warning is displayed to the user (Step 908). Alternatively, if the formation is not a shale, then a Possible Wet Zone Warning is displayed to the user (Step 904).

Returning to Step 900, if P1 is not less than P2, then a determination is made whether P1 is greater than P2 (Step 912). If P1 is not greater than P2, then P1 is equal to P2 and there has been no change in the parameter value. Alternatively, if P1 is greater than P2, then a determination is made whether the mud being used is water-based mud (Step 914). If the mud is water-based mud, a Possible Pay Zone Warning may be displayed to the user (Step 916). Alternatively, if the mud is not a water-based mud, then a determination is made whether the formation being drilled is a shale (Step 918). If the formation is a shale, then a Possible Fracturing Warning is displayed to the user (Step 920). Alternatively, if the formation is not a shale, then a Possible Pay Zone Warning is displayed to the user (Step 916). Those skilled in the art will appreciate that FIG. 9 represents only one example of process logic and is not meant to limit the scope of the invention.

Returning to FIG. 7, once the change (and/or significance) of the parameter value(s) has been determined, the change may be displayed to the user in a three-dimensional format (Step 708). As described in Step 706 above, the changes in parameter values may correspond to various changes in the formation or borehole, such as fracturing, etc. The results of applying the process logic to interpret the parameter change may also be displayed to the user.

In one embodiment of the invention, a color-coding of a single wellbore circumference, multiple, concentric sleeves, and/or wellbore circumference sizes and shapes are used to represent the change (or lack of change) in a parameter value. The computed values, determined in Step 704, are represented by a color-coding system. The color-coding system creates an association between a color and a parameter value, range of values, difference between two parameter values, or the rate of change of a parameter value. The color-coding system also provides an easy way to recognize an association among parameter values. The coding may alternatively be done with patterns, textures, or symbols.

Figure 10:
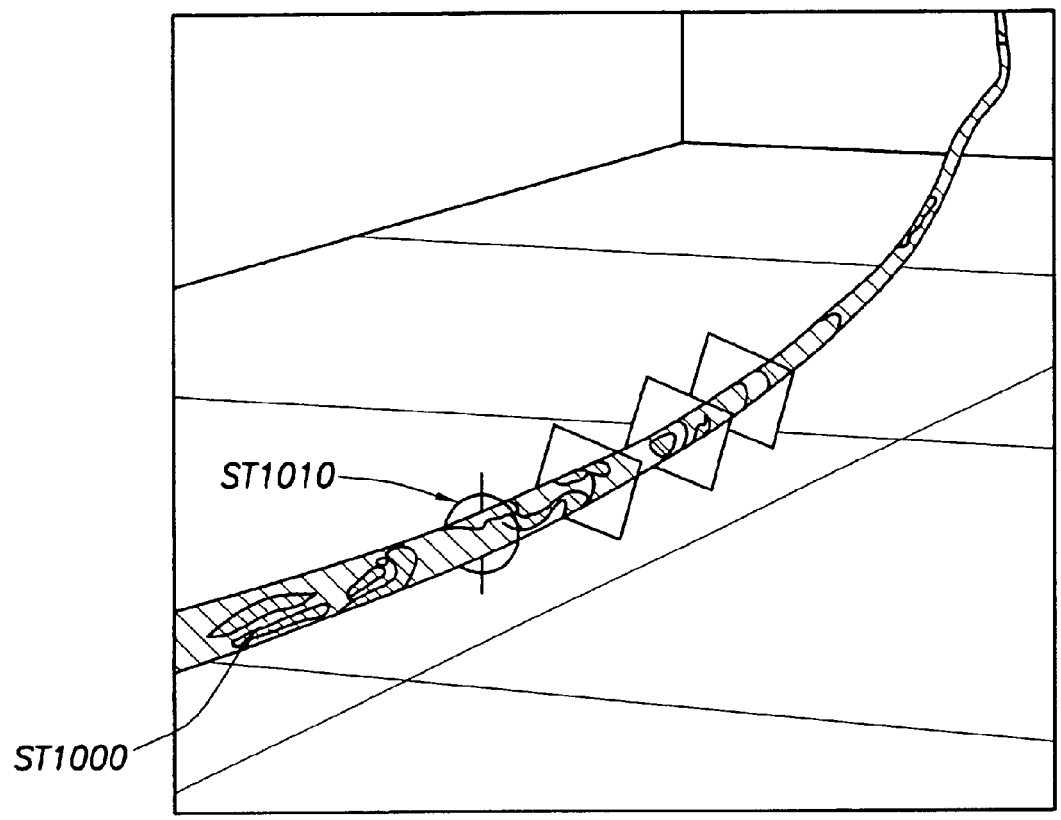
FIG. 10 shows a 3-D representation of a wellbore with color-coding accordance with one embodiment of the invention.

FIG. 10 shows a 3-D representation of a wellbore with color-coding in accordance with one embodiment of the invention. An orienting guide (1000) provides references to vertical, horizontal, and cardinal directions (North-South-East-West), as well as the top of wellbore. The circumference along the entire length of the wellbore (1010) is color-coded. This color-coding may be derived from any sensor measurement or computation, and may vary with azimuth around the circumference.

Figure 11:
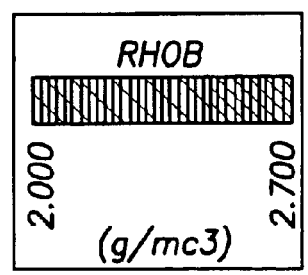
FIG. 11 shows a color-scale used to interpret the color-coding used in FIG. 10.OLE_LINK1

FIG. 11 shows a color-scale used to interpret the color-coding used in FIG. 10. In this example, the measured formation parameter is bulk density (RHOB). The units for RHOB are g/cm$^3$. One visualization method uses a color-scale to represent the difference between an initial value of a formation or borehole parameter and a subsequent value at the same depth. The color-scale is not limited to a gray scale as shown in FIG. 11.

Figure 12:
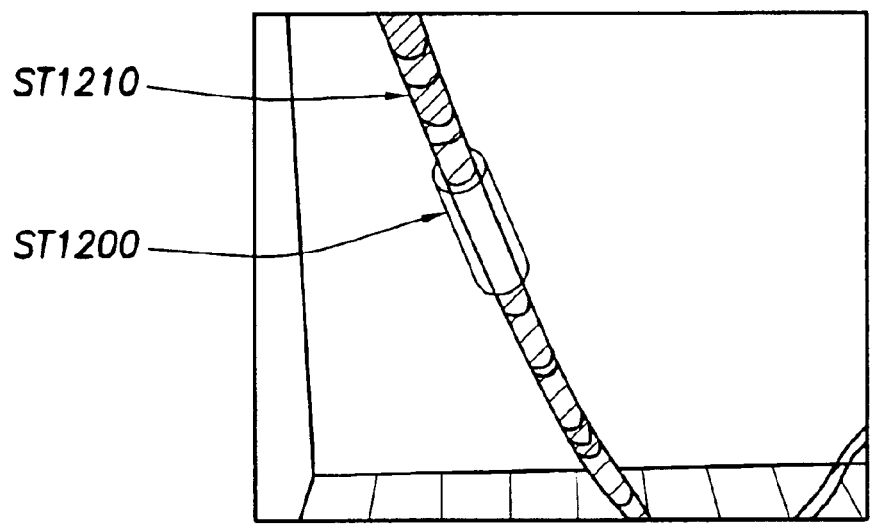
FIG. 12 shows a 3-D representation of a wellbore in accordance with one embodiment of the invention. OLE_LINK1

FIG. 12 shows a 3-D representation of a wellbore in accordance with one embodiment of the invention. In this embodiment, a transparent concentric sleeve (1200) around the original color-coded wellbore (1210) is used to show where the parameter has changed. The innermost wellbore circumference is color-coded to represent the initial value of a parameter at each depth, and additional color-coded sleeves represent the subsequent values of the parameter. Each additional sleeve represents a progressively later time of acquisition of the parameter. Also, each additional sleeve may represent the value of a parameter (e.g., resistivity) at a different radial depth within the formation.

Figure 13:
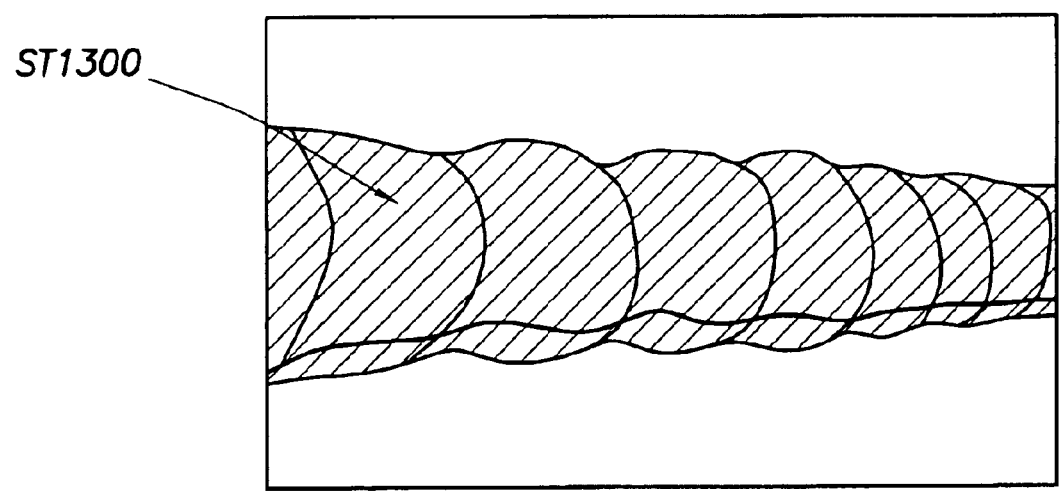
FIG. 13 shows a 3-D representation of a wellbore in accordance with one embodiment of the invention.

FIG. 13 shows a 3-D representation of a wellbore in accordance with one embodiment of the invention. In this embodiment of the invention, the parameter values and/or changes in parameter values and wellbore (1300) are represented using a variable diameter scheme and an associated color-coding scheme. By using a combination of attributes to the original wellbore and additional sleeves, a visual representation of the change (or lack of change) in more than one parameter value is possible.

Those skilled in the art will appreciate that the analysis of the parameter changes, performed in Step 706, may also be displayed using any one of the schemes shown in FIGS. 10–13. Additionally, the analysis of the parameter changes may be displayed to the user via dialogue boxes, such as those described in FIG. 9.

Embodiments of the invention may have one or more of the following advantages. A method to simply the processing of time-depth and time-data files so as to present depth-based data collected at different times over the same depth interval is provided. Further, a well operator is allowed to recognize formation parameter and borehole changes over time and prompt action that may reduce risk associated with drilling a wellbore, and can provide indications of the type of fluids held within the pore space of the formation (e.g., oil, water, or gas).

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting and visualizing changes in a borehole, comprising:
   correlating a time-depth file and a time-data file to obtain a plurality of measurements at a specific depth for a parameter;
   analyzing a parameter change using at least two of the plurality of the measurements to obtain an interpretation of the parameter change; and
   displaying the interpretation of the parameter change using a graphical representation.

2. The method of claim 1, further comprising:
   acquiring data for the time-data file and the time-depth file.

3. The method of claim 1, wherein displaying the interpretation of the parameter change comprises using a color-coding system.

4. The method of claim 1, wherein displaying the interpretation of the parameter change comprises displaying the plurality of measurements at the specific depth for the particular parameter.

5. The method of claim 1, wherein analyzing the parameter change comprises using process logic specific to the parameter.

6. The method of claim 5, wherein the interpretation is displayed using a dialog box.

7. The method of claim 1, wherein interpretation comprises a rate of change of the parameter.

8. The method of claim 7, wherein the rate of change is displayed using a color-coding system.

9. The method of claim 1, wherein interpretation comprises a difference between two of the plurality of measurements at the specific depth.

10. The method of claim 9, wherein the difference is displayed using a color-coding system.

11. The method of claim 1, wherein the graphical representation is a three-dimensional representation.

12. A computer system for detecting and visualizing changes in a borehole, comprising:
   a processor;
   a memory;
   a storage device;
   a computer display; and
   software instructions stored in the memory for enabling the computer system under control of the processor, to perform:
   correlating a time-depth file and a time-data file to obtain a plurality of measurements at a specific depth for a parameter;
   analyzing a parameter change using at least two of the plurality of the measurements to obtain an interpretation of the parameter change; and
   displaying the interpretation of the parameter change using a graphical representation.

13. The system of claim 12, further comprising:
   acquiring data for the time-data file and the time-depth file.

14. The system of claim 12, wherein displaying the interpretation of the parameter change comprises using a color-coding system.

15. The system of claim 12, wherein displaying the interpretation of the parameter change comprises displaying the plurality of measurements at the specific depth for the particular parameter.

16. The system of claim 12, wherein analyzing the parameter change comprises using process logic specific to the parameter.

17. The system of claim 16, wherein the interpretation is displayed using a dialog box.

18. The system of claim 12, wherein interpretation comprises a rate of change of the particular parameter.

19. The system of claim 18, wherein the rate of change is displayed using a color-coding system.

20. The system of claim 12, wherein interpretation comprises a difference between two of the plurality of measurements at the specific depth.

21. The system of claim 20, wherein the difference is displayed using a color-coding system.

22. The system of claim 12, wherein the graphical representation is a three-dimensional representation.

23. An apparatus for detecting and visualizing changes in a borehole, comprising:

means for correlating a time-depth file and a time-data file to obtain a plurality of measurements at a specific depth for a particular parameter;

means for analyzing a parameter change using at least two of the plurality of the measurements to obtain an interpretation of the parameter change; and means for displaying the interpretation of the parameter change using a three-dimensional representation.

* * * * *